(12) United States Patent
Metters et al.

(10) Patent No.: US 7,890,870 B1
(45) Date of Patent: Feb. 15, 2011

(54) MONITORING NETWORK FUNCTIONS CONCURRENTLY UTILIZING A PERFORMANCE DISPLAY

(75) Inventors: Dahl Metters, Shawnee Mission, KS (US); Arathi Pishey, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 672 days.

(21) Appl. No.: 11/951,952

(22) Filed: Dec. 6, 2007

(51) Int. Cl.
*G06F 15/177* (2006.01)
*G06F 3/048* (2006.01)
*G09G 5/02* (2006.01)

(52) U.S. Cl. .................. 715/736; 715/853; 345/593

(58) Field of Classification Search .......... 715/736, 715/853; 345/593
See application file for complete search history.

(56) References Cited

U.S. PATENT DOCUMENTS

| | | | | |
|---|---|---|---|---|
| 5,295,244 A | * | 3/1994 | Dev et al. ................ | 715/853 |
| 5,581,797 A | * | 12/1996 | Baker et al. ............... | 715/708 |
| 5,682,487 A | * | 10/1997 | Thomson .................. | 715/800 |
| 5,764,913 A | * | 6/1998 | Jancke et al. .............. | 709/224 |
| 5,909,217 A | * | 6/1999 | Bereiter .................... | 715/854 |
| 6,054,987 A | * | 4/2000 | Richardson ............... | 715/734 |
| 6,112,015 A | * | 8/2000 | Planas et al. .............. | 709/223 |
| 6,144,379 A | * | 11/2000 | Bertram et al. ............ | 715/835 |
| 6,456,306 B1 | * | 9/2002 | Chin et al. ................. | 715/810 |
| 6,975,330 B1 | | 12/2005 | Charlton | |
| 7,019,753 B2 | * | 3/2006 | Rappaport et al. ......... | 345/582 |
| 7,219,300 B2 | * | 5/2007 | Arquie et al. .............. | 715/736 |
| 7,426,694 B2 | * | 9/2008 | Gross et al. ............... | 715/762 |
| 7,796,534 B1 | * | 9/2010 | Arnold et al. ............. | 370/254 |

* cited by examiner

*Primary Examiner*—William L Bashore
*Assistant Examiner*—David Phantana-angkool

(57) ABSTRACT

A computerized method, computer system, and computer-readable media for monitoring network functions concurrently on a performance display is provided. In particular, the performance display is presented to an operator at a user-interface display that includes performance images that represent various network functions. These network functions may be selected from a listing of network functions by the operator for a personalized display. Upon selection, configuration settings are compiled based on the selected network functions and other information. The configuration settings direct a web server to retrieve corresponding performance images stored in a known location by a communications-network server that generates the network performance images from network-function data files. These performance images may be populated onto a layout pattern to generate the performance display. Accordingly, the operator is provided with a mechanism to monitor a plurality of network functions at the same time on a single user-interface display.

20 Claims, 7 Drawing Sheets

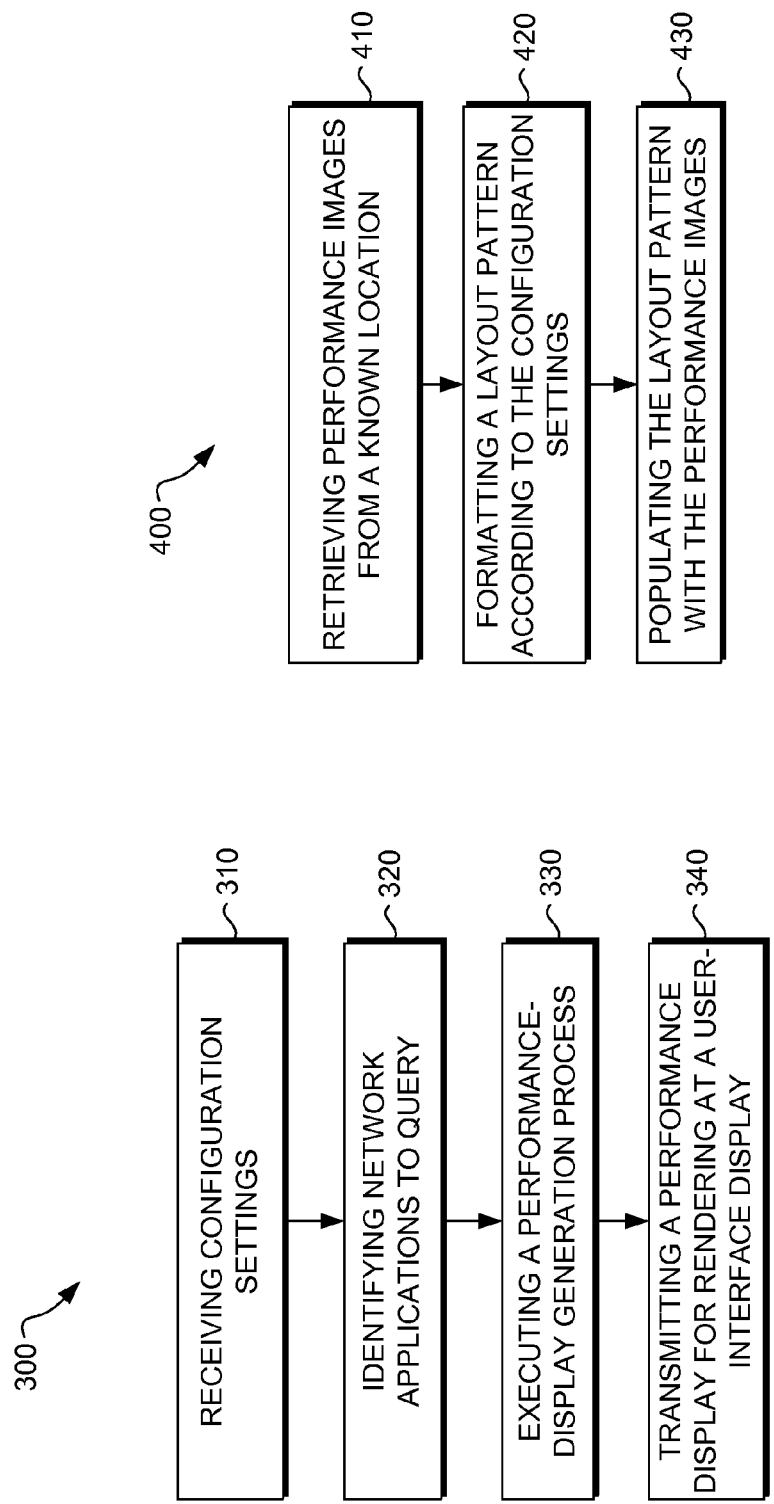

MONITORING NETWORK FUNCTIONS CONCURRENTLY UTILIZING A PERFORMANCE DISPLAY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The present invention relates generally to the field network applications within a communications network, and more particularly to computing devices that can manage multiple network functions from various network applications on a user-interface display.

Communications networks function to establish a temporary electronic communication channel between a caller and a called party. Typically, the communication channel carries network traffic, which transports information communicated by the parties. Network traffic may take the form of electronic signals carrying actual vocal communication between users, as well as data among distributed computing systems (e.g., financial transactions, facsimile signals, Internet "surfing," e-mail exchanges, network housekeeping, and the like).

Further, network traffic varies over time, date, and locality according to usage factors. However, economics prohibit communications networks from providing sufficient capacity for high peaks (i.e., multiple parties trying to access the network) in these network traffic fluctuations as this amount of capacity would be idle much of the time, constituting a wasted investment. Accordingly, operators of communications networks strive to make the best use of communications network resources balancing available capacity with the present load of network traffic.

In order to carry out balancing capacity and load, operators of communications networks must monitor network traffic and the resources consumed thereby. Additionally, operators must monitor a large array of data to accurately diagnose and correct any issues negatively impacting the communications. Thus, a method for presenting a large amount of diverse data to an operator, where the data is continuously refreshed based on network traffic, would be helpful to identify these issues.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Embodiments of the invention provide computer-readable media for, among other things, performing a method for providing compact and efficient presentation of a large and diverse quantity of data related to a communications network. In particular, a performance display is presented to an operator at a user-interface display that includes performance images representing various network functions. These network functions may be selected from a listing of network functions by the operator for a personalized display. Upon selection, configuration settings are compiled based on the selected network functions and other information. The configuration settings direct a web server to retrieve corresponding performance images stored in a known location by the communications-network server. The communications-network server derives performance images from the network-function data files based on a listing of the data files locations available in a database. Further, performance images may be derived from current network-function data files if the file system watcher object in the communications-network server detects an update to the network function data files. Accordingly, the operator is provided with a mechanism to monitor a plurality of up-to-date network functions.

Embodiments generally relate to monitoring network applications utilizing a performance display. More particularly, a first aspect of an embodiment is directed to a set of computer-useable instructions embodied on computer-readable media for operating an electronic locking mechanism. Initially, configuration settings are received from a computing device. Typically, the configuration settings include a manifest of applications-of-interest. The appropriate network applications to query are identified based on the applications-of-interest. A performance-display generation process is conducted that includes the following steps, in no particular order: collecting performance images stored in a known location by the communications-network server, where the performance images are derived from a set of network-function data files provided by the identified network applications; formatting a layout pattern based on a number of applications-of-interest included in the configuration settings; and populating the layout pattern with the collected performance images. The performance display may be transmitted to a computing device for rendering on a user-interface display.

In a second aspect, embodiments are directed toward a computerized system for performing a method of monitoring network functions utilizing a performance display. The computerized system includes at least a receiving component, an identification component, a communications-network server, a performance-display generation component, a communication component, and a monitoring component. Initially, the receiving component is provided for receiving a request to view the performance display. Typically, the request includes a manifest of applications-of-interest. The identification component is provided for identifying the appropriate network functions to watch based on the applications-of-interest. The communications-network server is provided for retrieving a set of network-function data files from one or more network applications, where the set of network-function data files corresponds to the listing of network-function data files available in the database. In one embodiment, the performance images are derived from the set of network-function data files. The performance-display generation component is provided for executing a performance-display generation process that includes the following steps, in no particular order: collecting the performance images stored in a known location by the communications-network server; formatting a layout pattern based on a number of applications-of-interest included in the configuration settings; and populating the layout pattern with the performance images. The communication component is provided for transmitting the performance display to a computing device. The monitoring component is provided for determining whether to update the performance images rendered at the user-interface display.

A further aspect of an embodiment takes the form of a computerized method for monitoring network functions utilizing a performance display. Initially, a request to view network functions from a web-browser application is received at a web server. Typically, the request includes the following items: a uniform resource locator (URL) address targeting the web server; a manifest of applications-of-interest; and an ordering of the manifest of applications-of-interest. In one embodiment, the ordering relates to a location of performance images within the layout pattern of the performance display. Appropriate network applications to query are identified based on the applications-of-interest. A set of network-function data files is retrieved from the identified network applications, where each data file of the set of network-function data files corresponds to the network functions being managed by one of the identified network applications. A performance-display generation process is performed that includes the following steps, in no particular order: collecting performance images stored in a known location by the communications-network server, where each of the performance images is derived from each of the set of network-function data files, respectively; formatting a layout pattern based on the ordering of the applications-of-interest; and populating the layout pattern with the collected performance images. The performance display is transmitted for rendering on a user-interface display. The collected performance images are updated by monitoring current performance images being stored a known location by the communications-network server. Accordingly, if the collected performance images vary upon comparison against corresponding current performance images stored in a known location by the communications-network server, the layout pattern is populated with the current performance images.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 3 is a flow diagram showing an overall method for rendering a performance display, in accordance with an embodiment;

FIG. 4 is a flow diagram showing a method for executing a performance-display generation process, in accordance with an embodiment;

DETAILED DESCRIPTION

Figure 1:
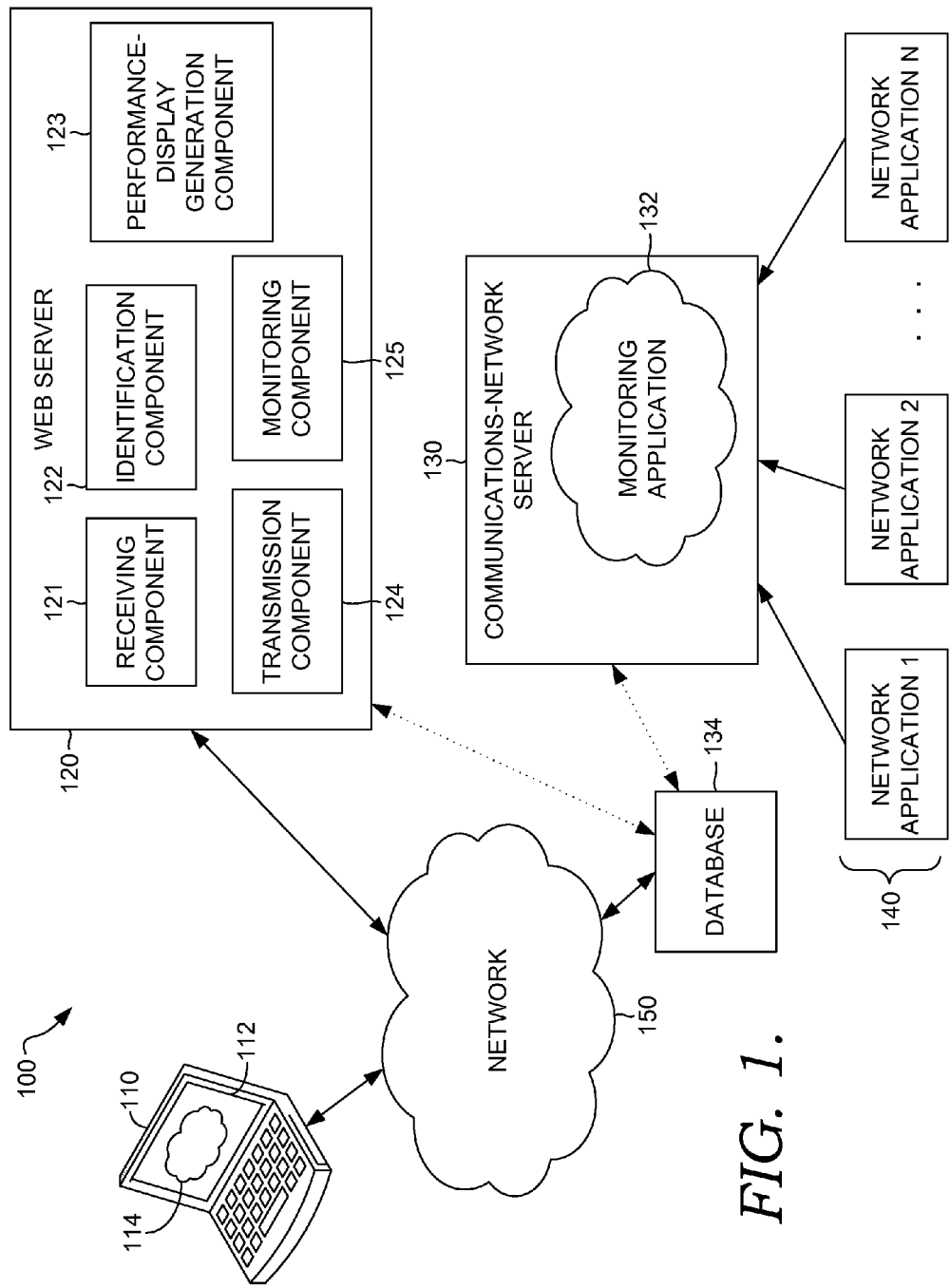
FIG. 1 is a block diagram of an exemplary system architecture suitable for use in implementing embodiments of the present invention.

Embodiments detailed herein provide systems and methods for monitoring network functions concurrently utilizing a performance display. Initially, in a communications network, control centers are utilized to monitor the overall health of the network functions of the communications network. Typically, an operator (i.e., control center personnel) selects which functions s/he desires to observe by selecting from a listing of network functions on a selection screen. The selected functions are distributed as a manifest of applications-of-interest for retrieval of associated performance images. Incident to an indication from the operator to view the performance display, performance images which have been stored in a known location by the communications-network server are collected according to the manifest of applications-of-interest. In embodiments, the performance images are generated from the network-function data files. Accordingly, the performance images graphically present a variety of network functions that can be concurrently presented at a single screen.

Acronyms and Shorthand Notations

Throughout the description, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| CDMA | Code Division Multiple Access |
| --- | --- |
| HTML | Hypertext Markup Language |
| iDEN | Integrated Digital Enhancement Network |
| URL | Uniform Resource Locator |

Further, various technical terms are used throughout this description. A definition of such terms can be found in *Newtons Telecom Dictionary* by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments may be embodied as, among other things, a computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and nonremovable media, and contemplates media readable by a database, a switch, and various other network devices. By way of example, computer-readable media comprise media implemented in any method or technology for storing information. Examples of stored information include computer-useable instructions, data structures, program modules, and other data representations. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Methods and systems are provided for monitoring network functions at a performance display. The network functions to monitor may be selected based on automated selection or according to operator-initiated selections (i.e., at user interface 600 of FIG. 6). These selections are typically embodied in the form of configuration settings. As used herein, the phrase "configuration settings" is not meant to be limiting but to encompass a broad scope of script that influences the identification and/or gathering of performance images. In one embodiment, the configuration settings include a manifest of applications-of-interest that an operator desires to view concurrently on a user-interface display. By way of example only, the manifest of applications-of-interest is aggregated from selections from a listing of network functions. In other embodiments, the configuration settings include, but are not limited to, ordering (i.e., an indication of the position of each performance image within a layout pattern), external web pages to display as part of the performance display, or any other information that affects the configuration of a performance display. In embodiments, the configuration settings may be stored in relation to a browser application on a computing device. For example, the form of storage may be a cookie, or any other type of storage medium that is accessible by an Internet server and/or intranet server when operably connected thereto.

Generally, some aspects of the present invention relate to utilizing the configuration settings to select network functions to monitor, typically at a performance display. As used herein, the phrase "network functions" is not meant to be limiting, but to encompass all possible applications and services offered and/or watched by a communications network. In one embodiment, as discussed more fully below with reference to FIG. 6, network functions may include a status map of telecommunications equipment by city, wireless customer tickets by application, third-party website performance, and applications performance. These network functions allow display and monitoring of individual processing including, but not limited to: voice quality, network traffic volume, call-setup time, call completions, performance quality of network components, and communication products (e.g., cell phones, personal digital assistants, computing devices, etc.) using the communications network. Although many examples are discussed above, other embodiments of the network functions contemplate any functions monitored by an operator (e.g., manager on duty) of a communications-network control center that are known or used by those having ordinary skill in the relevant field.

In embodiments, network functions are monitored by network applications, as discussed more fully with reference to FIG. 1. These network applications manage and/or oversee one or more network functions and collect data relevant thereto. This data may be transmitted via a set of network-function data files to a communications-network server, or database, for processing and storage. In one instance, processing includes retrieving the performance images stored in a known location by the communications-network server. The communications-network server works independently to generate performance images from network-function data files. The communications-network server employs one or more file system watcher objects that are triggered whenever the network-function data files are updated, thus causing current performance images to be generated. Accordingly, in this instance, performance images are configured to present a representation (e.g., performance webpage) of one or more network functions in a graphical manner. Further, processing may include a performance-display generation process that collects the performance images, formats a layout pattern (see FIG. 6), and populates the layout pattern with performance images.

Figure 6:
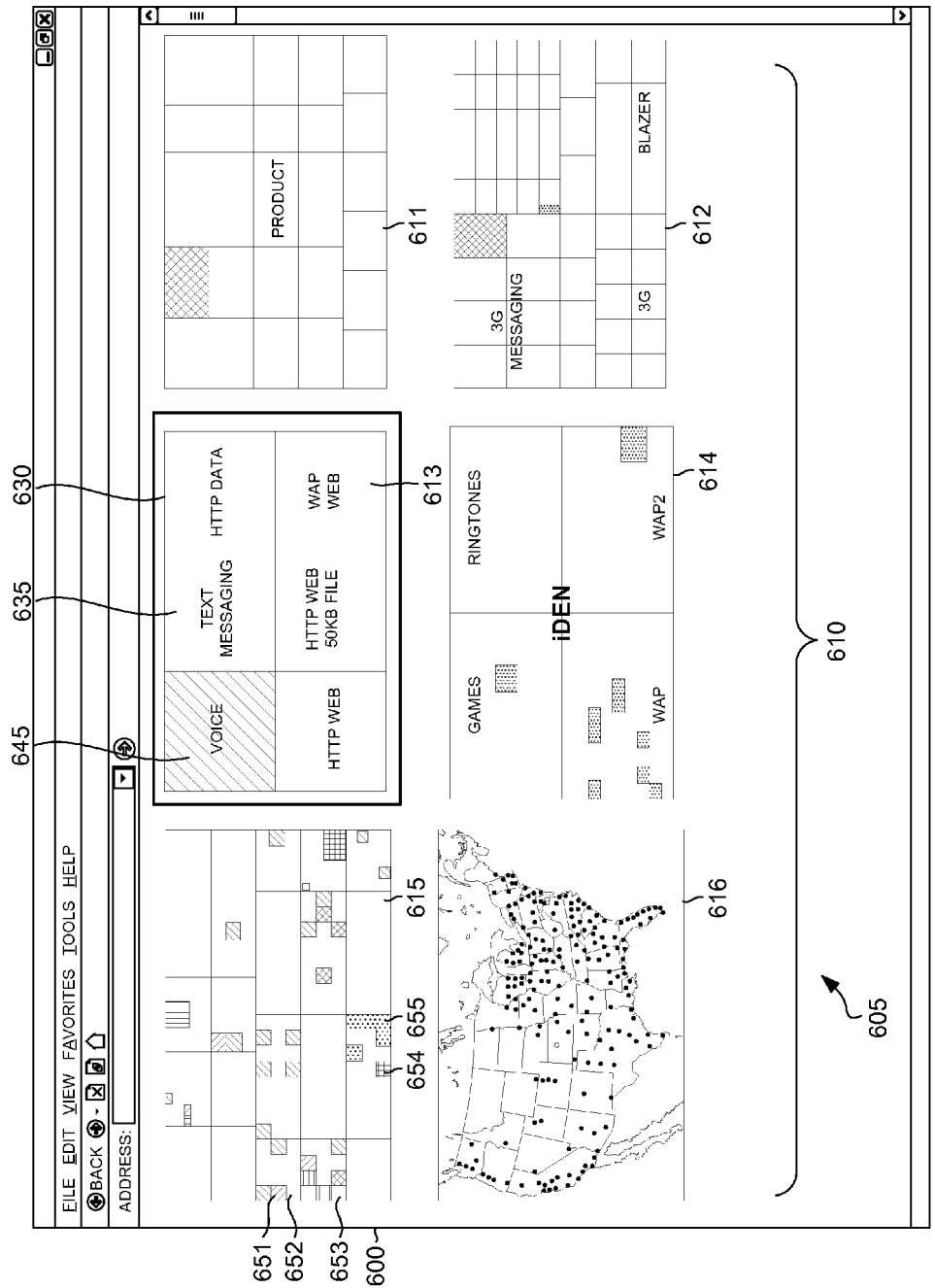
FIG. 6 is a screen display of an exemplary user interface wherein a performance display having six performance images is shown, in accordance with an embodiment.

In embodiments, the performance images comprise, or are populated with, at least one "graphic object." These graphic objects, as depicted in FIG. 6, may be a visual depiction of subdivisions of network functions. By way of example, and not limitation, a subdivision of a network function relates to integral attributes thereof. Accordingly, the graphic objects are linked to the integral attributes of the network functions. In some instances, the integral attributes reflect the operational organization of a network function, as by geographic region, major customers, classes of service, types of applications, or any other appropriate scheme of categorization. These integral attributes are typically managed and collected by the network applications and transmitted to the communication-network server, or database, in the form of function-aspect data. The function-aspect data may be transmitted within the set of network-function data files or via separate pathways. In embodiments a graphic object is assigned a score based on the function-aspect data. This score may be utilized to color code the graphic object. The color codes assigned to the graphic objects, and/or other subdivisions of the network functions, provide an immediate visual indication of the status of the integral attributes of a network function that are associated therewith in the performance images in the performance display. In particular, the immediate visual indication may alert an operator to a problematic situation within the communications network and effect corrective actions to alleviate the detected problematic situation.

Typically, the color codes are assigned to the graphic objects, and/or performance images, by querying a "network analysis key" with the score. The network analysis key is used broadly herein to signify a mechanism for reading a score associated with a particular item, comparing the score against one or more ranges of data values, and mapping a certain color code to the item if the score appertains to one of the ranges. By way of example, the ranges of data values may comprise a color scale corresponding predefined indexes of levels of performance related to a network function or integral attribute thereof. In particular, in embodiments, each color of the color scale corresponds to a particular level or performance specific to an integral attribute of a network function. In some instances, the colors are universal to good, average, and poor levels of performance across multiple network functions. In one of these instances, a green color may represent an acceptable quality of network performance, while a red color may represent an unacceptable quality of network performance, thereby providing a common color scheme that is easily understood. Although the phrases "color code," "color scale," and "color" are used throughout, it should be understood and appreciated that other visual indications (e.g., monochromatic tones, graphic patterns, blinking areas, etc.) or audio signals may be employed to assist an operator in monitoring network functions.

Referring to the drawings in general, and initially to FIG. 1 in particular, a block diagram of an exemplary operating environment is shown and designated generally as computing system 100 configured to monitor network functions concurrently utilizing a performance display.

Illustrative computing system 100 includes, in one embodiment, a computing device 110, a web server 120, a communications-network server 130, a database 134, and network applications 140 all in communication with one another via a network 150 (which may actually be multiple networks). Although the various components of FIG. 1 are shown with lines for the sake of clarity, in reality, delineating various components is not so clear, and metaphorically, the lines would more accurately be grey or fuzzy.

Further, although some components of FIG. 1 are depicted as single blocks, the depictions are exemplary in nature and in number and are not to be construed as limiting (e.g., although only one computing device 110 is shown, many more may be operably coupled to network 150). Network 150 operably couples components 110, 120, 130, 134, and 140 (wired, wirelessly, or a combination thereof).

Each of computing device 110, a web server 120, a communications-network server 130, a database 134, and network applications 140, shown in FIG. 1, may take the form of various types of computing devices. By way of example only, components 110, 120, 130, 134, and 140 may be a personal computing device, handheld device, consumer electronic device, and the like. Additionally, computing device 110 is configured to display a presentation at user-interface display 112 and even to receive input(s) affecting a presentation at the user-interface display 112, in one embodiment. The user-interface display 112, operably coupled to the computing device 110, may be configured as any presentation component (not shown) that may be capable of presenting information to an operator. In one exemplary embodiment, the user-interface display 112 presents a prompt for the operator to provide selection(s) (e.g., selection of network function to monitor, selection of ordering, etc.) into one or more input-entry areas. In another exemplary embodiment, the user-input display 112 renders multiple performance images, each associated with a network function, concurrently within a performance display. Accordingly, an operator at a communications-network control center may monitor a large amount of communications-network information at once in an easy-to-interpret format.

In embodiments, the computing device 110 includes a web-browser application 114 that may be manipulated by the operator. The web-browser application 114 is generally configured to access and communicate with the web server 120. In one instance, access to the web server 120 is attained by providing an appropriate uniform resource locator (URL) address to the web-browser application 114 that targets the web server 120. In another instance, communication may be via an internet (e.g., the World Wide Web) or an intranet (e.g., internal system to the communications network). Accordingly, the software for monitoring the network applications (e.g., monitoring application 132), and for configuring the performance display (e.g., components 121, 122, 123, 124, and 125), along with any stored data (e.g., network-function data files), may reside on external servers. Thus, memory space on the computing device 110 is freed, while the performance images, and updates thereto, are still continuously accessible.

With continued reference to FIG. 1, the web server 120 for facilitating monitoring network functions by generating performance images is provided. The web server 120 includes a receiving component 121, an identification component 122, a performance-display generation component 123, a transmission component 124, and a monitoring component 125. The web server 120 is but one example of a suitable server and is not intended to suggest any limitation as to the scope of use or functionality of the invention. Neither should the illustrated web server 120 be interpreted as having any dependency or requirement relating to any one or combination of the components 121, 122, 123, 124, and 125 illustrated. In some embodiments, one or more of the components 121, 122, 123, 124, and 125 may be implemented as stand-alone applications. In other embodiments, one or more of the components 121, 122, 123, 124, and 125 may be integrated directly into the operating system of the web server 120 or the communications-network server 130. By way of example only, the monitoring component 132 may reside in the web server 120, and the database 134 is a stand-alone device. In the instance of multiple servers, the present invention contemplates providing a load balancer to federate incoming queries to the servers. It will be understood by those of ordinary skill in the art that the components 121, 122, 123, 124, and 125 illustrated in FIG. 1 are exemplary in nature and in number and should not be construed as limiting. Any number of components may be employed to achieve the desired functionality within the scope of embodiments of the present invention.

In embodiments, the receiving component 121 is configured for receiving a request to view the performance display. In one instance, the request includes a URL address that targets the web server 120. In another instance, the request includes the configuration settings, discussed more fully above, that have a manifest of applications-of-interest. In contrast, the configuration settings may be provided to the web server 120 separate of the request (e.g., in a response to a query from the web server 120). Although two different configurations of the configuration setting have been described, it should be understood and appreciated by those of ordinary skill in the art that other forms of the request could be used, and that the present invention is not limited to those requests shown and described.

The identification component 122, in one embodiment, is generally configured for identifying the appropriate network functions to watch based on the applications-of-interest provided in the configuration settings. In another embodiment, where the web server 120 and the communications-network server 130 are a common device, the identification component 122 identifies the appropriate network applications 140 to query based on the configuration settings. Identification, by way of example, is performed by searching an index (e.g., lookup table) that converts the operator-initiated selections into identifiers of network functions and/or network applications 140 to view. Although an index is described above, one of ordinary skill would understand and appreciate that any mechanism for translating configuration settings generating indicator(s) to network performance information may be used.

With continued reference to FIG. 1, the communications-network server 130 will now be discussed. Generally, the communications-network server 130 is configured for retrieving a set of network-function data files from the network applications 140. In embodiments, the set of network-function data files corresponds to the identified network functions being managed by the network applications 140. The network applications 140, described herein, relate to the various network functions and/or monitor their operation.

The communications-network server 130 includes a monitoring application 132 and uses a database 134. The monitoring application 132 is configured to perform a variety of functions. In an initial instance, the monitoring application 132 is configured to automatically retrieve a set of network-function data files independent of any request to view a performance display. A location of the network-function data files to retrieve, typically from the network applications 140, may be provided by the database 134. In embodiments, the current network function data files are automatically retrieved thereafter based on whether the file system watcher objects, which watch the network-function data files, are triggered. The file system watcher object, for a network-function data file, may be triggered when the file is updated with current data. In one embodiment, current performance images are derived from the set of current network-function data files, using the HTML Screen Capture object which generates an image from a HTML source. Typically, the current performance images have a time-date stamp appended thereto, where the time-date stamp is based on the time frame of rendering each performance image. The time-date stamp is utilized by the monitoring component 125, discussed more fully below, to update performance images presented at the user-interface display 112.

As discussed above, the database 134 may be incorporated within the communications-network server 130, the web server 120, or configured as a stand-alone device. In embodiments, the database 134 stores network-function information, typically in the form of information pointing to the location of network-function data files. In one embodiment, the database 134 is structured such that network-function information is associated with, or mapped to, results of the identification component 122. The database 134 may be searchable by any component of the computing system 100 thereby allowing for identification and retrieval of current network-performance data files according to the performance display. Thus, providing efficient access to these current network-performance data files facilitates monitoring the communications network to discover changes within one or more network functions.

Returning to the web server 120, the performance-display generation component 123, in embodiments, is configured for executing a performance-display generation process. The performance-display generation process includes, but is not limited to, the following steps: collecting the performance images from the communications-network server 130; formatting a layout pattern; and populating the layout pattern with the performance images. The layout pattern may be based on a number of applications-of-interest included in the configuration settings, the size of a presentation area on the user-interface display 112, or any other factors that are known to affect arranging multiple images on a display. In one instance, the layout pattern is a grid that organizes the performance images in substantial lateral and/or horizontal alignment. Generally, populating the layout pattern includes positioning performance images on a format provided by the layout pattern. In one instance, an ordering, associated with the manifest of applications-of-interest provided in the configuration settings, indicates the location of the performance images within the layout pattern of the performance display. In another embodiment, populating the layout pattern with the performance images includes resizing the performance images based on dimensions of the layout pattern. The dimensions of the layout pattern may relate to the format of the layout pattern, the number of performance images, or any other variable that is known to affect presentation on a graphical user-interface display.

The transmission component 124 is configured for transmitting to a computing device the performance display. As discussed above, the performance display is generated by the steps executed, in any order, by the performance-display generating component 123. The transmission component 124 is capable of converting the performance display into any known format and transmitting the performance display over any known communications pathway. For instance, converting may include creating a web page for delivery over an intranet pathway. By way of example only, creating the web page is performed utilizing hypertext markup language (HTML).

The monitoring component 125 is configured for determining whether to update the performance images rendered at the user-interface display. Typically, the monitoring component 125 is triggered upon initially rendering a representation of the performance display at the user-interface display 112 and determining whether to update the performance images includes comparing the collected performance images (e.g., being presently displayed) against corresponding current performance images stored at the database 134 on the communications-network server 130.

Figure 2B:
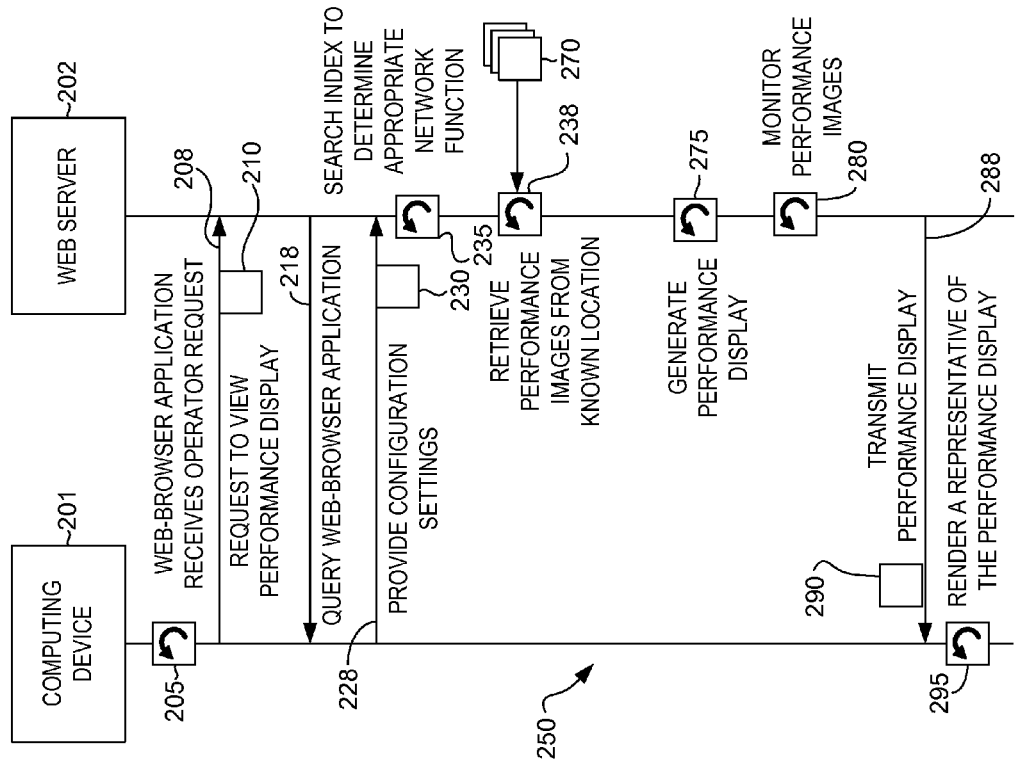
FIGS. 2A and 2B are diagrammatic charts showing methods for monitoring network functions concurrently utilizing a performance display, in accordance with an embodiment.
Figure 2A:
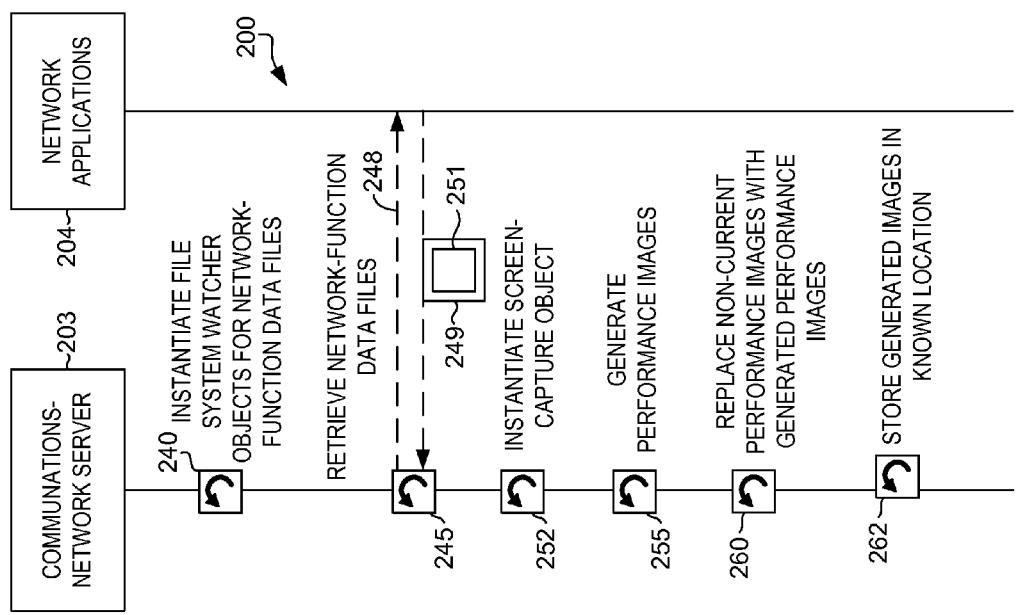

Turning now to FIG. 2A, a diagrammatic chart is showing a method 200 illustrating an embodiment of monitoring network functions. Initially, a file system watcher object within a communications-network server 203 is triggered to continuously monitor the network-function data files listed in a known location (e.g., database 134 of FIG. 1) for updates, as indicated by procedure 240. Incident to triggering the file system watcher object, the communications-network server 203 performs a procedure 245 to retrieve network-function data files. The procedure 245 includes conveying to network application 204 a retrieval request 248. Typically, one or more network-function data files 249 are returned from the network applications 402 upon recognizing the retrieval request 248. In one embodiment, the network function data files include function-aspect data 251. The function-aspect data 251 may be utilized for assigning a color code to a graphic object, wherein the color code affects the presentation of a graphic object. In embodiments, the process of assigning generally includes the following: determining a score for the at least one graphic object (e.g., utilizing a scoring algorithm) according to the function-aspect data; querying a network analysis key with the score, where the network analysis key associates the color code with a range of data values; and mapping the color code to the graphic object if the score appertains to the range of data values. The communications-network server 203 then executes procedure 252, which instantiates the screen capture object. At procedure 255 a performance image is generated utilizing the network-function data file by the screen capture object. Generating performance images may also include populating each performance image with at least one graphic object such that the graphic object is represented according to the assigned color code, as discussed above. A procedure 260 replaces previously generated performance images with a current performance image. These current performance images may be stored in a known location (e.g., identified by the database 134 of FIG. 1), as indicated at procedure 262. The file system watcher object(s) in the communications-network server 203 continue monitoring the network-function data files for further changes.

Turning now to FIG. 2B, a diagrammatic chart is illustrated showing a method 250 for monitoring network functions concurrently utilizing a performance display, in accordance with an embodiment. Initially, as indicated at procedure 205, a web-browser application (e.g., web-browser application 114 of FIG. 1) receives a request 208 to view a performance display from an operator at computing device 201 (e.g., computing device 110 of FIG. 1). The request 208 is transmitted to a web server 202 (e.g., web server 120 of FIG. 1) and may include a web address that targets the web server 202. The request 208 triggers the web server 202 to transmit a query 218 to the computing device 201. Incident to receiving the query 218, the computing device 201 provides a response 228 with the configuration settings 230 previously selected by the operator, or any other user. However, if the configuration settings are not available, the operator will be prompted to select network functions to monitor and to provide other information that may be utilized to generate a performance display.

Upon receiving the configuration settings 230, the web server 202, at procedure 235, searches an index to identify appropriate network functions, network applications, or any other source(s) of network-performance information associated with information within the configuration settings (e.g., manifest of applications-of-interest). The procedure 238 retrieves the performance images 270 generated by the communication server for the identified network functions from a known location. Typically, the known location is a database (e.g., database 134 of FIG. 1) or a data store that is mapped to the web server 202.

Incident to receiving the performance images 270, the web server 202 generates a performance display 290, at procedure 275. The performance display 290 may be generated according to the any one, or combination, of the process described above, with reference to the performance-display generation component 123 of FIG. 1. The performance images 270 may be monitored (e.g., at monitoring component 125 of FIG. 1), at procedure 280, upon generation of the performance display 290, upon transmission 288 of the performance display 290 to the computing device 201, or any time after the transmission 288. Additionally, monitoring may be a continuous process of scanning for changes to the performance images 270 periodically.

In one embodiment, monitoring includes comparing the displayed performance images against the current performance images (e.g., stored in the database 134 of FIG. 1 or in a cache within computing system 100). If these compared performance images do not match, then the current performance images are typically retrieved to the web server 202 for incorporation into the performance display 290. In this instance, the operator may be alerted to the update of performance image(s). By way of example, the alert may include highlighting each updated performance image for a predetermined time interval. In other embodiments, the alert may be changing screen colors, an audio signal, a blinking indication at the user-interface display, or any other method of flagging an object known to those of ordinary skill in the computing industry.

Upon transmission 288 of the performance display 290 to the computing device 201, the computing device 201 may store the performance display 290. In embodiments, the computing device 201 is further configured to render a representation of the performance display at a user-interface display, at procedure 295. In some instances, the representation of the performance display 295 being rendered at the user-interface display may be refreshed incident to receiving an updated performance display at the computing device 201. As discussed above, the representation may be a performance display 290 captured as a web page and rendered by a web-browser application.

Referring to FIG. 3, a flow diagram is illustrated that shows an overall method 300 for rendering a performance display, in accordance with an embodiment. As indicated at block 310, configuration settings, typically including a manifest of applications-of-interest and an ordering thereof, are received at a web server, a communications server, or a combination thereof (e.g., utilizing receiving component 121 of FIG. 1). As indicated at block 320, the network applications to query are identified (e.g., utilizing identification component 122 of FIG. 1). A performance-display generation process may be executed to retrieve the performance images stored in a known location by the communications-network server (e.g., utilizing monitoring application 132 of FIG. 1), and to prepare the performance display utilizing the performance images, as indicated at block 330. As indicated at block 340, upon preparing the performance display, the performance display may be transmitted for rendering at a user-interface display (e.g., utilizing transmission component 124 of FIG. 1).

Turning to FIG. 4, a flow diagram is illustrated that shows a method 400 for executing a performance-display generation process, in accordance with an embodiment. Initially, performance images are retrieved from a known location, as indicated at block 410. As indicated at block 420, a layout pattern is formatted, typically according to information within the configuration settings established at the computing device and provided to the web browser. The layout pattern may be then populated with performance images, as indicated at block 430.

Figure 5A:
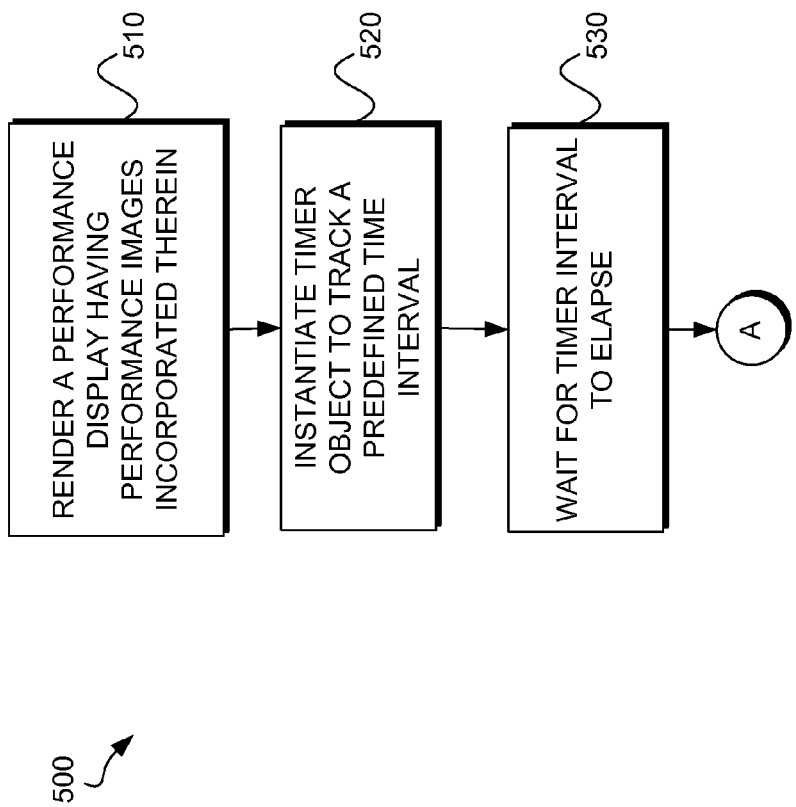
FIGS. 5A and 5B depict a flow diagram showing a method for individually updating each performance display being presented on the performance display, in accordance with an embodiment.
Figure 5B:
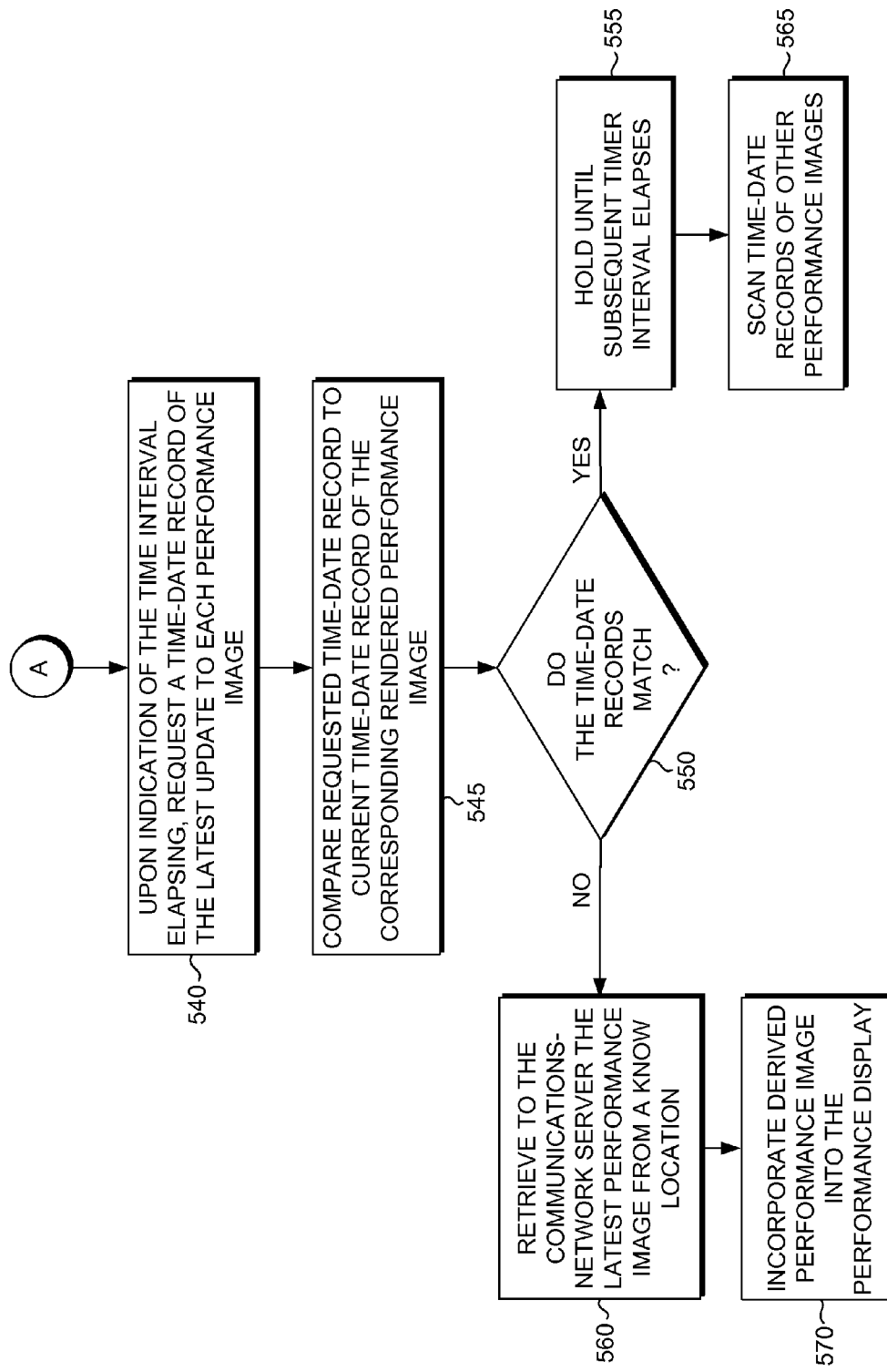

With reference to FIGS. 5A and 5B, a flow diagram illustrating a method 500 for individually updating each performance display being presented on the performance display, in accordance with an embodiment, is shown. Initially, as indicated at block 510, a performance display that has performance images therein is rendered, typically at a user-interface display. A timer object to track a predefined time interval is instantiated, as indicated at block 520. Accordingly, there is no activity until an indication of the time interval elapsing, as indicated at block 530.

Upon indication of the predefined time interval elapsing, as monitored by the timer object, a time-date record (e.g., stamp appended to a current performance image) of a latest update to each performance image is requested, as indicated at block 540. As indicated at block 545, the requested time-date record is compared against the current time-date record of a corresponding rendered performance image. If it is determined that the time-date records match, as indicated at block 550, the web server pauses until a subsequent timer interval elapses, as indicated at block 555. In addition, the web server continues to scan time-date records of other performance images for future comparison, as indicated at block 565. If it is determined that the time-date records do not match, as indicated at block 550, the web server retrieves a current performance image related to the rendered performance image, as indicated at block 560. The derived performance image may then be incorporated into the performance display, as indicated at block 570.

Turning now to FIG. 6, an exemplary screen display of an exemplary user interface 600 wherein a performance display 605 having six performance images 610 is shown, in accordance with an embodiment. In the embodiment depicted, performance display 611 relates to a network function of tracking wireless customer tickets by application. Performance display 612 relates to a network function for monitoring third-party website performance for a code division multiple access (CDMA) communication channel, while performance display 614 relates to a network function for monitoring third-party website performance for an integrated digital enhancement network (iDEN), and performance display 616 relates to a network function for showing a status map of a region. These performance displays 611, 612, 614, and 616 are exemplary embodiments and are depicted to demonstrate the scope of network functions that may be monitored. Accordingly, other numbers of the performance images with the performance display 605, and various alternative network functions besides those depicted are contemplated by the invention.

Performance display 613 relates to a network function of applications performance on an iDEN. The performance display 613 is subdivided into a rectangular matrix of graphic objects, including graphic objects 635 and 645. In one embodiment, the graphic objects are labeled to assist an operator in identifying the integral attribute of the network function that it represents. In the embodiment depicted, graphic object 635 is color coded differently than graphic object 645. In particular, graphic object 645 is color coded to indicate an issue pertaining to a corresponding integral attribute of the network function represented by the performance image 613. In addition, highlight 630, in the form of a box bordering the performance display 613, indicates that an update to the performance image has been recently made, thereby temporarily alerting the operator. As discussed above, highlight 630 is not limited to a rectangular border, but may take the form of any indication designed to gain the attention of an operator.

Exemplary performance display 615 relates to a network function of applications performance for a CDMA communications channel. The performance display 615 includes graphic objects 651, 652, 653, 654, and 655 that are color coded according to function-aspect data from a network application. Each of the graphic objects 651, 652, 653, 654, and 655 has a different color coding associated therewith to indicate a different status of each. Accordingly, the range of a color scale utilized by the network analysis key may be broad to show many levels of performance related to a network function or integral attribute thereof. Further, the graphic objects may be integrated within other graphic objects to monitor specific applications and/or services within the integral attributes of the performance display 615.

Figure 7:
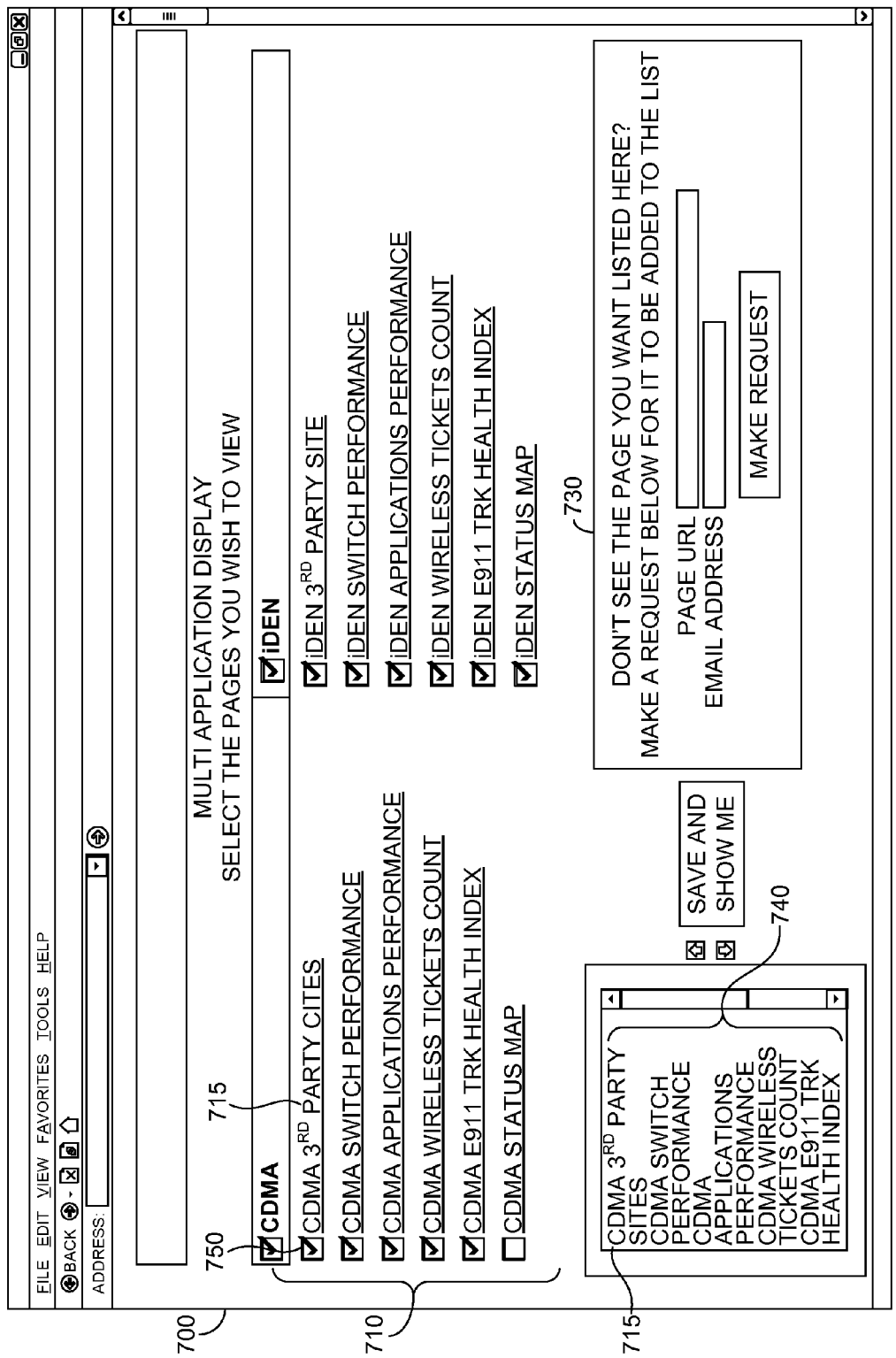
FIG. 7 is a screen display of an exemplary user interface wherein an operator is prompted to operator-initiated selections in response to a listing of network functions, in accordance with an embodiment.

FIG. 7 is an exemplary screen display of an exemplary user interface 700 wherein an operator is prompted to operator-initiated selections in response to a listing of network functions 710, in accordance with an embodiment. A network function 715 may be selected for monitoring at an operator-input prompt 750. The operator-input prompt 750 is utilized to mark the network function 715 for selection, or may be utilized to deselect those network functions that the user no long desires to monitor. Marking may be indicated by any known method in the field of the invention, such as checkboxes (as shown). The selected network function 715 may be provided with an ordering 740, which relates to the position of the associated performance image on the performance display. The selected network function 715 may be aggregated (e.g., based on the markings) into a manifest of applications-of-interest and incorporated into the configuration settings, as discussed more fully above. In addition to selecting network functions, an operator may additionally select other web pages, documents, operations of the communications network, etc., to monitor at a user prompt 730. Accordingly, a rich and robust performance display may be generated that is tailed to an operator's specific area of responsibility.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable media having computer-useable instructions embodied thereon for performing a method of monitoring network applications utilizing a performance display, the method comprising:
   receiving, from a computing device, configuration settings, the configuration settings comprising a manifest of applications-of-interest;
   identifying the appropriate network applications to query based on the applications-of-interest;
   performing a performance-display generation process, wherein the performance-display generation process comprises:
      collecting performance images stored in a known location by a communications-network server, wherein the performance images are derived from a set of network-function data files provided by the identified network applications;
      formatting a layout pattern based on a number of applications-of-interest included in the configuration settings; and
      populating the layout pattern with the collected performance images; and
   transmitting to the computing device the performance display for rendering on a user-interface display.

2. The method of claim 1, wherein the configuration settings further comprise an ordering associated with the manifest of applications-of-interest that indicates a location of the performance images within the layout pattern of the performance display.

3. The method of claim 1, wherein identifying comprises searching an index of network applications and matching each of the manifest of applications-of-interest to the network applications based on the network functions managed by the network applications.

4. The method of claim 1, wherein populating the layout pattern with the performance images comprises resizing the performance images based on dimensions of the layout pattern.

5. The method of claim 1, further comprising updating the performance images upon comparing the collected performance images against corresponding current performance images stored in a known location by the communications-network server.

6. A computerized system for performing a method of monitoring network functions utilizing a performance display, the system comprising:
   a receiving component for receiving a request to view the performance display, the request comprising a manifest of applications-of-interest;
   an identification component for identifying the appropriate network functions to watch based on the applications-of-interest;
   a communications-network server for retrieving a set of network-function data files from one or more network applications, wherein the set of network-function data files corresponds to the identified network functions being managed by the one or more network applications, wherein performance images are derived from the set of network-function data files;
   a performance-display generation component for executing a performance-display generation process, wherein the performance-display generation process comprises:
      collecting the performance images stored in a known location by the communications-network server,
      formatting a layout pattern based on a number of applications-of-interest included in the configuration settings; and
      populating the layout pattern with the performance images; and
   a transmission component for transmitting to a computing device the performance display.

7. The system of claim 6, further comprising a computing device for conveying the request to view a performance display, wherein the request is an operator-initiated input to a web-browser application operating on the computing device.

8. The system of claim 7, wherein the user-initiated input is a uniform resource locator (URL) address that targets a web server on which the receiving component resides.

9. The system of claim 7, wherein the computing device is operably coupled to a user-interface display configured for rendering the performance display thereon.

10. The system of claim 9, wherein the user-interface display is configured for receiving operator-initiated selections in response to a listing of network functions, the selections being aggregated into the manifest of applications-of-interest.

11. The system of claim 6, wherein the communications-network server is further configured for automatically retrieving a set of current network-function data files from the one or more network applications upon receiving an indication of a change to one of the set of network-function data files from a file-system watcher.

12. The system of claim 11, wherein the communications-network server is further configured to derive current performance images from the set of current network-function data files, the current performance images having a time-date stamp appended thereto.

13. The system of claim 12, further comprising a monitoring component for determining whether to update the performance images rendered at the user-interface display.

14. The system of claim 13, wherein determining comprises:
  requesting the time-date stamp appended to the current performance images; and
  comparing the time-date stamp to an indication of when the performance images are rendered.

15. The system of claim 13, wherein determining comprises:
  recognizing an elapse of a predefined time interval while monitoring the performance images; and
  retrieving for rendering the current performance images upon recognizing the predefined time interval elapsing and identifying the current performance images as having been updated.

16. The system of claim 13, wherein the monitoring component further comprises alerting an operator of an update to the performance images by highlighting each updated performance image of the performance images for a predetermined time interval.

17. The system of claim 6, wherein the communications-network server is further configured to color code at least one graphic object within the performance images, wherein color coding comprises:
  receiving function-aspect data within each of the set of network-function data files;
  populating each performance image of the performance images with the at least one graphic object; and
  assigning a color code to the at least one graphic object according to the function-aspect data.

18. The system of claim 17, wherein assigning a color code comprises:
  determining a score for the at least one graphic object according to the function-aspect data;
  querying a network analysis key with the score, the network analysis key associating the color code with a range of data values; and
  mapping the color code to the graphic object if the score appertains to the range of data values.

19. The system of claim 6, wherein identifying the appropriate network functions to watch based on the applications-of-interest comprises searching an index of network functions residing on a web server.

20. A computerized method for monitoring network functions utilizing a performance display, the method comprising:
  receiving at a web server, from a web-browser application, a request to view network functions, the request comprising a uniform resource locator (URL) address targeting the web server, a manifest of applications-of-interest, and an ordering of the manifest of applications-of-interest that relates to a location of performance images within the layout pattern of the performance display;
  identifying the appropriate network applications to query based on the applications-of-interest;
  retrieving a set of network-function data files from the identified network applications, wherein each data file of the set network-function data files corresponds to the network functions being managed by one of the identified network applications;
  performing a performance-display generation process, wherein the performance-display generation process comprises:
    collecting performance images stored in a known location from a communications-network server, wherein each of the performance images is derived from each of the set of network-function data files, respectively;
    formatting a layout pattern based on the ordering of the applications-of-interest; and
    populating the layout pattern with the collected performance images;
  transmitting the performance display for rendering on a user-interface display;
  updating the collected performance images by monitoring current performance images being stored in the communications-network server; and
  if the collected performance images vary upon comparison against corresponding current performance images stored in the communications-network server, populating the pattern layout with the current performance images.

* * * * *